A. E. NOBLE.
METAL WHEEL.
APPLICATION FILED DEC. 21, 1908.
933,102.
Patented Sept. 7, 1909.
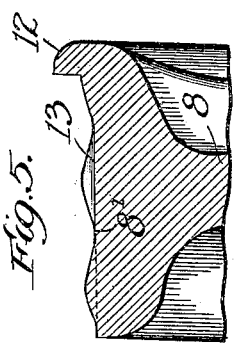
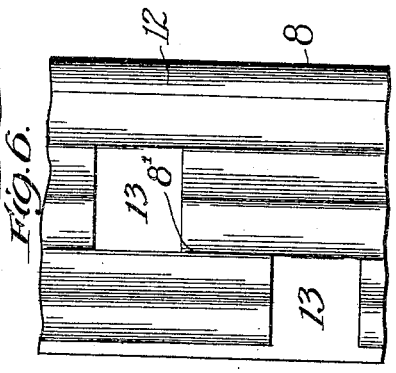
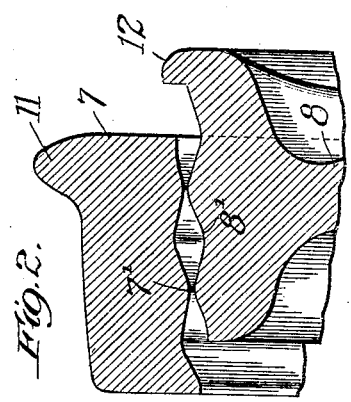
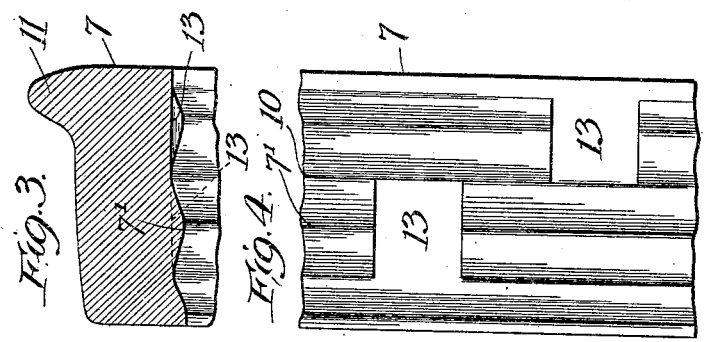
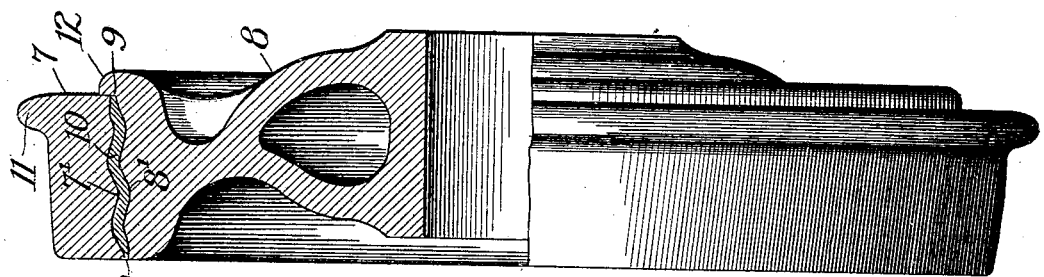

UNITED STATES PATENT OFFICE.

ALBERT E. NOBLE, OF ANNISTON, ALABAMA.

METAL WHEEL.

933,102.

Specification of Letters Patent.   Patented Sept. 7, 1909.

Application filed December 21, 1908. Serial No. 468,448.

*To all whom it may concern:*

Be it known that I, ALBERT E. NOBLE, a citizen of the United States, residing at Anniston, in the county of Calhoun and State of Alabama, have invented new and useful Improvements in Metal Wheels, of which the following is a specification.

This invention relates to improvements in metal wheels and more particularly to that class of wheels which comprises a tire member made of one kind of metal and mounted on a center member made of another kind of metal.

It has been customary heretofore to secure a steel tire member on a cast iron center member by shrinking or by bolts and other devices, but, so far as I am aware, these methods of securing the two members together necessitate making a machine fit between the members and a considerable amount of work which increases the cost of production materially.

The object of the present invention is to secure the tire member on the center member in a simple and effective manner, without the necessity of machine fitting, and without loss of material, and to make the parts interchangeable. And a further object of the invention is to secure the two members together in a firm and rigid manner so as to avoid relative movement of the members and at the same time enable the replacement of the tire member as required.

My invention is particularly adapted for car wheels and for this reason I have illustrated it as thus embodied in the accompanying drawings in which—

Figure 1 shows a car wheel partly in section and partly in elevation and embodying my invention. Fig. 2 is a detail sectional view showing the tire member slipped partly on the center member. Fig. 3 is a sectional view of the tire member. Fig. 4 is an inside plan view of a portion of the tire member. Fig. 5 is a detail sectional view of the center member. Fig. 6 is an outside plan view of a portion of the center member.

Referring to the drawings, 7 is a tire member and 8 the center member of my improved wheel, the former being preferably made of steel and the latter of cast iron but I do not limit the invention to these particular metals. The tire member has an inside diameter larger than the outside diameter of the center member and both members are provided on their opposing faces with a plurality of circumferential corrugations 7', 8'. The corrugations 7' on the inner face of the tire member are preferably, but not necessarily, arranged in complementary position to the corrugations 8' on the center member so that when the tire member is properly arranged on the center member the space between their opposing faces, which space is to be filled with a filling material, will be of substantially the same width radially of the wheel throughout its length axially of the wheel except at the side edges 9 of the wheel where the opposing faces of the tire member and center member are so shaped as to make the space between said members tapered. The annular space between the two members is filled by a filler 10 consisting of a liquid material that will solidify, preferably a molten metal or an alloy. As the volume of the filler is comparatively small it will solidify quickly and without imparting any appreciable heat to either member. But I prefer to heat the tire member before it is arranged on the center member and before the filling material is poured into the annular space between said members, so that when the tire member cools it will be securely bound by contraction to the center member. The corrugated faces of the tire and center members may be parallel with the axis of the wheel or not as desired, but I prefer to make them parallel with each other throughout the greater portion of their length from one side edge of the wheel to the other, as hereinbefore pointed out. The filler will therefore be of substantially the same thickness throughout its area except at the side edges of the wheel where it is tapered (at 9) to hold the filling material in said annular space and prevent fragments thereof from escaping in case of fracture. It is not essential that the opposing faces of the two members should be concentric. Under ordinary conditions the two members will be locked so securely together by the filler that there can be no relative movement of these members. Any force tending to move the tire member relative to the center member in a direction parallel to its axis is resisted by the interlocking engagement of the filler with the corrugations of the two members. The surfaces on one side of the corrugations oppose movement in one direction and the surfaces on the other side of the corrugations oppose movement in the opposite direction. These half corrugations on the two members present surfaces like frustums of a cone in which the larger diameter is forced toward the smaller. The corrugated surfaces on each member may present, in cross section, a series of straight or curved lines or of straight lines joined by curves, the latter construction being illustrated in the drawings as preferred.

In car wheels the axial strains are greatest in number and intensity in a direction toward the flange 11 and hence I prefer to taper the opposing faces of the tire and center members from the inner or flanged side of the wheel to the outer side thereof, as shown, so that the diameter of the annular space will be greater at the flanged side of the wheel than at the outer side thereof. I also prefer to provide car wheels with a peripheral flange 12 on the center to overlap the flanged side of the tire. This flange strengthens the wheel and braces the tire, and it also forms a bottom for the annular space between the tire and center members, when the latter are laid on their side to receive the filling material. The flange also forms a guide for the adjustment of a renewal tire so that it can be located in the same position as the tire which it is replacing.

It will be understood that the corrugated faces of the tire and center members need not be "finished" but may be left in their rough condition, which increases the interlocking engagement of the filler with said members. Ordinarily there will be very little likelihood of the tire and center members moving relatively in a circumferential direction, but to avoid all possibility of such relative movement, I may provide pockets 13 in any suitable arrangement in the corrugated faces of the members. In Figs. 3 to 6 I have shown the pockets located alternately in different corrugations. The filling material forms keys in these pockets which will effectually avoid any relative movement of the members circumferentially.

My invention materially reduces the cost of manufacture of metal wheels by avoiding all necessity for machining the tire and center members, and it also avoids the necessity for special tools to construct the parts. The tire member is securely held in place on the center member and yet it can be readily removed and replaced as required. A filling material may be used which can be removed and used again, if desired, to save expense.

What I claim and desire to secure by Letters Patent is:

1. A metal wheel comprising a center member and a tire member adapted to be arranged on the center member with an annular space therebetween, the opposing faces of said members being corrugated circumferentially and inclined transversely, and a filler in said space.

2. A metal wheel comprising a center member and a flanged tire member adapted to be arranged on the center member with an annular space therebetween, the opposing faces of said members being corrugated circumferentially and inclined inwardly transversely from the inner flanged side of the wheel to the outer side thereof, and a filler in said space.

3. A metal wheel comprising a center member and a tire member adapted to be arranged on the center member with an annular space therebetween, the opposing faces of said members being corrugated circumferentially and constructed to make said annular space tapered at the sides of the wheel, and a filler in said space.

4. A metal wheel comprising a center member and a tire member adapted to be arranged on the center member with an annular space therebetween, the opposing faces of said members being corrugated circumferentially, with the corrugations on one member between the sides thereof complementary to the oppositely disposed corrugations on the other member, and said opposing faces of the members being inclined toward each other at the side edges of the members to make said annular space contracted at the sides of the wheel and of substantially uniform width between its contracted ends, and a filler in said space.

5. A metal wheel comprising a center member and a tire member adapted to be arranged on the center member with an annular space therebetween, the opposing faces of said members having a plurality of circumferential corrugations extending from edge to edge thereof, and one of said members having pockets in its opposing faces, located alternately in different corrugations, and a filler in said space and pockets.

6. A metal wheel comprising a center member and a tire member adapted to be arranged on the center member with an annular space therebetween, the opposing faces of said members having a plurality of circumferential corrugations extending from edge to edge thereof, and both of said members having pockets in said faces, located alternately in different corrugations, and a filler in said space and pockets.

7. A metal wheel comprising a center member and a tire member adapted to be arranged on the center member with an annular space therebetween, the opposing faces of said members having a plurality of circumferential corrugations extending from edge to edge thereof, and a filler in said space, said tire member being held by contraction rigidly on the filler and center member.

8. A metal wheel comprising a center member and a tire member adapted to be arranged on the center member with an annular space therebetween, the opposing faces of said members having a plurality of circumferential corrugations extending from edge to edge thereof, and a filler in said space, said tire member being heated to a higher temperature than the center member and to a less temperature than the filler when it is poured into said space so that the tire member will be securely held on the filler and the center member by contraction.

ALBERT E. NOBLE.

Witnesses:
A. S. PERKINS,
ALVIS WILLIAMS.